H. M. KORETZKY AND I. FERTMAN.
PORTABLE HAND LAMP.
APPLICATION FILED AUG. 5, 1919.

1,366,084. Patented Jan. 18, 1921.

Harry M. Koretzky,
Isedor Fertman, Inventors
By their Attorney
H. S. MacKaye

UNITED STATES PATENT OFFICE.

HARRY M. KORETZKY, OF BROOKLYN, AND ISEDOR FERTMAN, OF NEW YORK, N. Y.

PORTABLE HAND-LAMP.

1,366,084.      Specification of Letters Patent.      Patented Jan. 18, 1921.

Application filed August 5, 1919. Serial No. 315,514.

*To all whom it may concern:*

Be it known that we, HARRY M. KORETZKY and ISEDOR FERTMAN, both citizens of the United States, residing at Brooklyn, Kings county, State of New York, and at New York, Bronx county, State of New York, respectively, have invented certain new and useful Improvements in Portable Hand-Lamps; and we do hereby declare the following to be a full, clear, and exact description of the invention, such as will enable others skilled in the art to which it appertains to make and use the same.

The present invention relates to improvements in portable hand lamps of the kind in which an electric light is carried upon a casing which contains the battery supplying current to the light.

One object of the invention is to provide a novel form of portable lamp wherein two batteries side by side in mutually inverted position are made available for lighting the light carried upon the casing. Another object of the invention is to provide a novel and simple form of contact making device or switch for use in connection with the other features of my invention.

Figure 1:
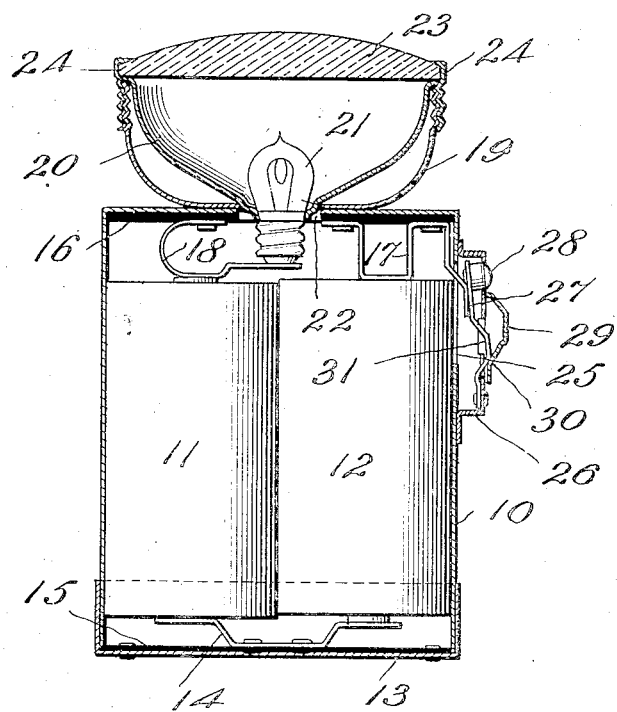
Figure 2:
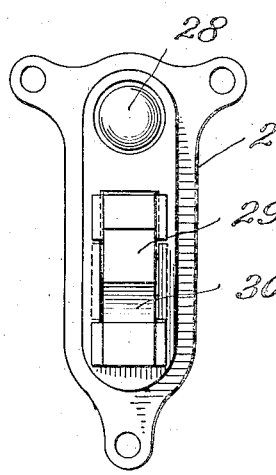
Figure 3:
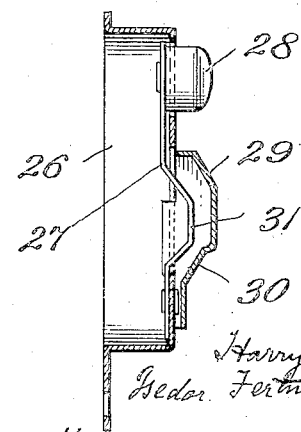

The invention is illustrated in a preferred form in the accompanying drawing, wherein Figure 1 is a vertical longitudinal section of our device, the batteries being shown in elevation, Fig. 2 is a plan view of the switch as seen from the outside, and Fig. 3 is a longitudinal sectional view of the switch.

The casing 10 is preferably of metal and is shaped so as conveniently to hold two batteries 11 and 12 side by side, with their usual external insulating covering, as shown. These batteries may consist of one or more cells apiece, and, as shown, are placed in mutually inverted relation with respect to their polarities. The carbon end is uppermost in the left hand battery and is lowermost in the right hand battery.

The batteries are held in place by a cap 13 carrying a spring 14 insulated from the cap and casing by the layer 15 of strawboard or other appropriate insulating material. The spring 14 not only holds the batteries up with firm contact with the terminals at the top or front of the casing, but it serves to connect the two batteries in series, as it makes electric contact with the zinc end of the left hand battery and the carbon end of the right hand battery.

At the front of the casing, an insulating layer 16 is provided which carries the terminal 17, making contact with the zinc pole of the right hand battery, and also the terminal 18 which makes contact with the carbon pole of the left hand battery. Both of these terminals are normally insulated from the casing 10.

At the front end of the casing 10 we prefer to place a supplementary casing 19, which contains and protects the reflector 20. This reflector has an opening at the bottom into which is screwed the usual form of incandescent bulb 21, which projects through an opening 22 into the battery casing. In this position the external terminal of the lamp 21 is in electrical contact with the reflector 20, and the casings 19 and 10, while the central terminal of the lamp makes contact with a spring extension on the terminal 18. The central lamp terminal is therefore in electrical connection with the carbon pole of the combined batteries, through the spring 18.

We prefer to secure the reflector 20, together with the usual lens 23, by means of a metal rim 24 which can be screwed down onto the front end of the supplemental casing 19, as shown.

In order to light the lamp it is only necessary to connect the terminal 17 electrically with the outer or screw terminal of the lamp, and our broad invention covers any means for accomplishing this. In the prefererd form shown, however, we employ a switch or circuit closer on the side of the casing of the following character.

One end of the metal strip forming the terminal 17 is extended to project slightly through an opening 25 in the side or edge of the casing 10. Over this opening is placed a protective plate or shell 26, within which is fixed a spring 27 having a button 28. When this button is pressed, the spring 27 touches the extension of the terminal 17 (see Fig. 1) and brings said terminal into electric connection with the outer or screw terminal of the bulb 21 through the casings 10 and 19 and the reflector 20, thereby lighting the lamp.

If it is desired to preserve this connection without continuing to press the thumb or finger upon the button 28, the contact-retaining means shown may be used. For this purpose we provide a plate 29 arranged to slide longitudinally upon the shell 26, and this plate is provided with a sloping portion 30, which acts like a cam upon a bent up portion 31 of the spring 27, when the plate 29 is pushed forward as shown in Fig. 1. As there shown, this results in pushing down the spring to close circuit. Upon sliding the plate 29 back (as in Fig. 3) the circuit is opened, because the spring 27 acts normally to preserve the open circuit position shown in Fig. 3.

Various changes can be made in this device by those skilled in the are without departing from our invention, and we do not limit ourselves to the details herein shown and described.

What we claim is—

In a portable electric light, a metallic casing having an opening, an incandescent lamp bulb at one end thereof, two mutually inverted battery cells side by side within the casing, metallic terminals carried by and normally insulated from the casing at the two ends of the battery for connecting it in series with the lamp, one of said terminals having an extension leading to the opening in the casing, and a circuit-closing device on the casing adapted to connect said extension with the casing.

In testimony whereof, we affix our signatures.

HARRY M. KORETZKY.
ISEDOR FERTMAN.